Sept. 5, 1967
K. B. KNUTSON
3,339,797
LABEL DISPENSERS
Filed April 4, 1966
4 Sheets-Sheet 1
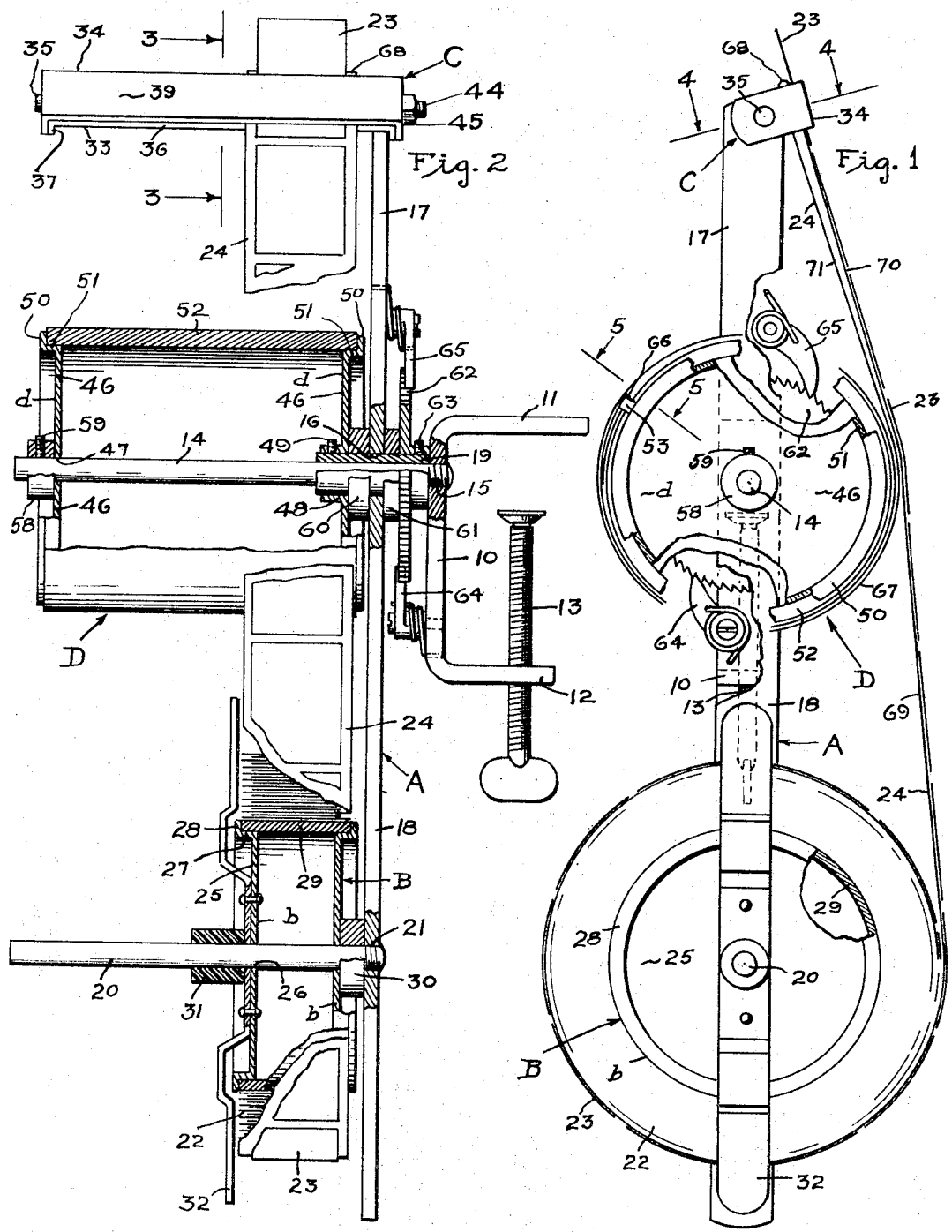
INVENTOR.
Kermit B. Knutson
By Caswell, Lagaard & Wicks
Attorneys

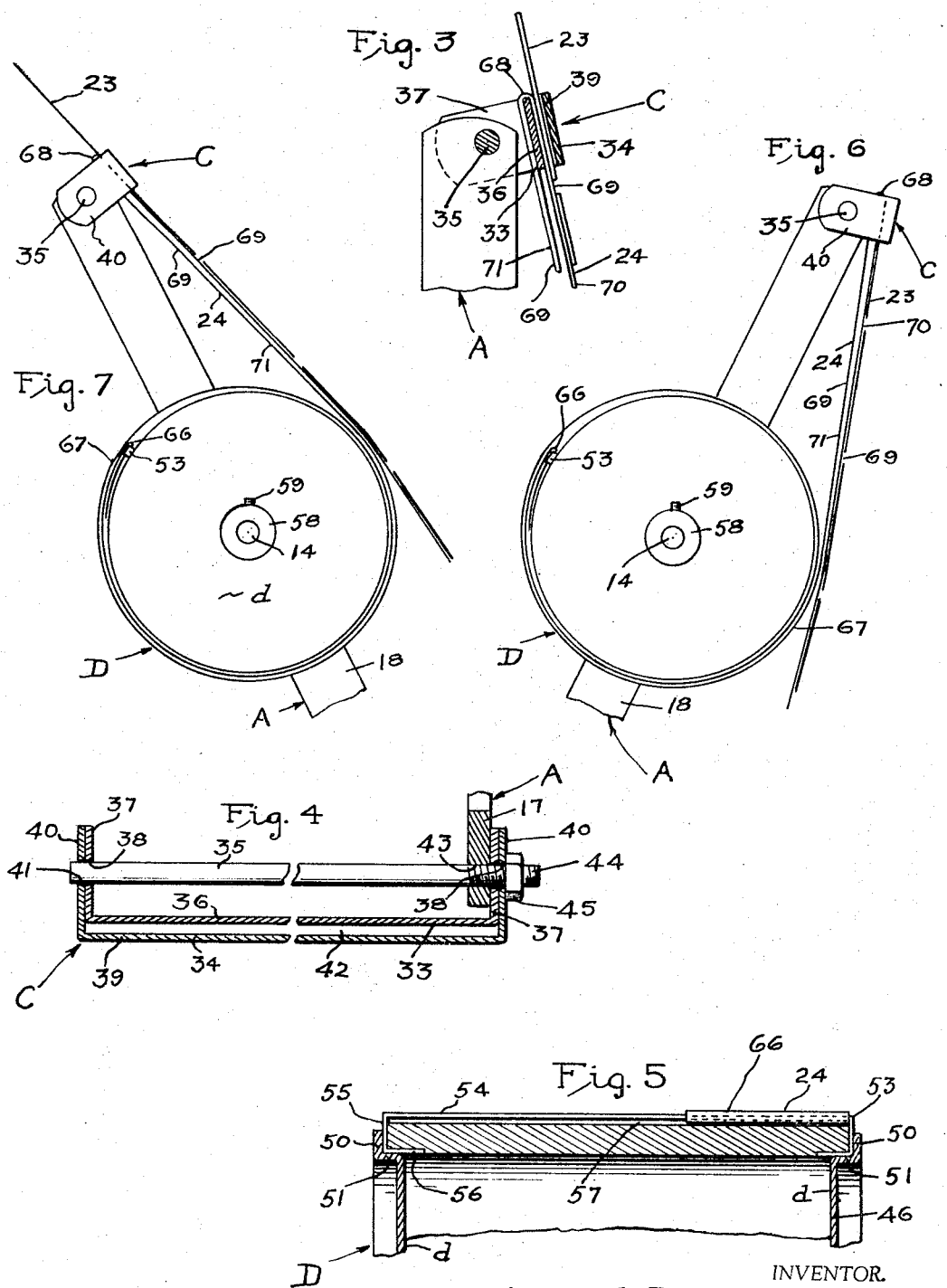

Sept. 5, 1967
K. B. KNUTSON
3,339,797
LABEL DISPENSERS
Filed April 4, 1966
4 Sheets-Sheet 3
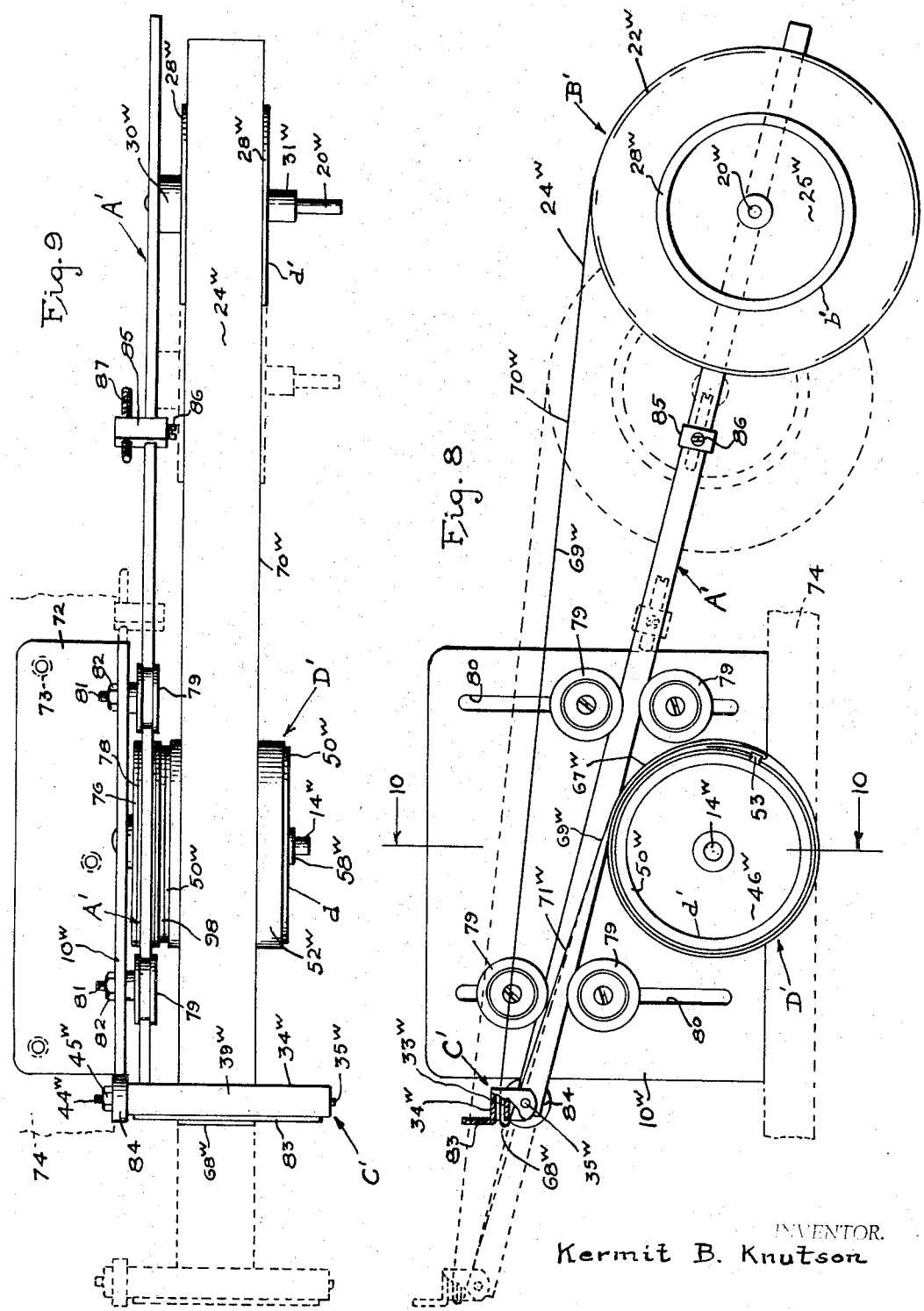
INVENTOR.
Kermit B. Knutson
By Caswell, Lagaard + Wicks
Attorneys Sept. 5, 1967     K. B. KNUTSON     3,339,797
LABEL DISPENSERS
Filed April 4, 1966     4 Sheets-Sheet 4
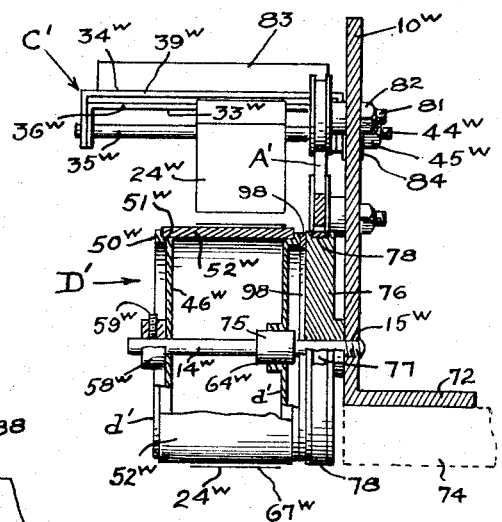
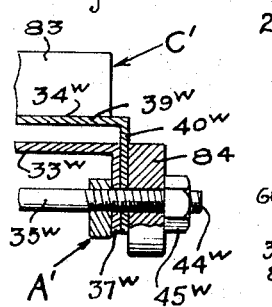
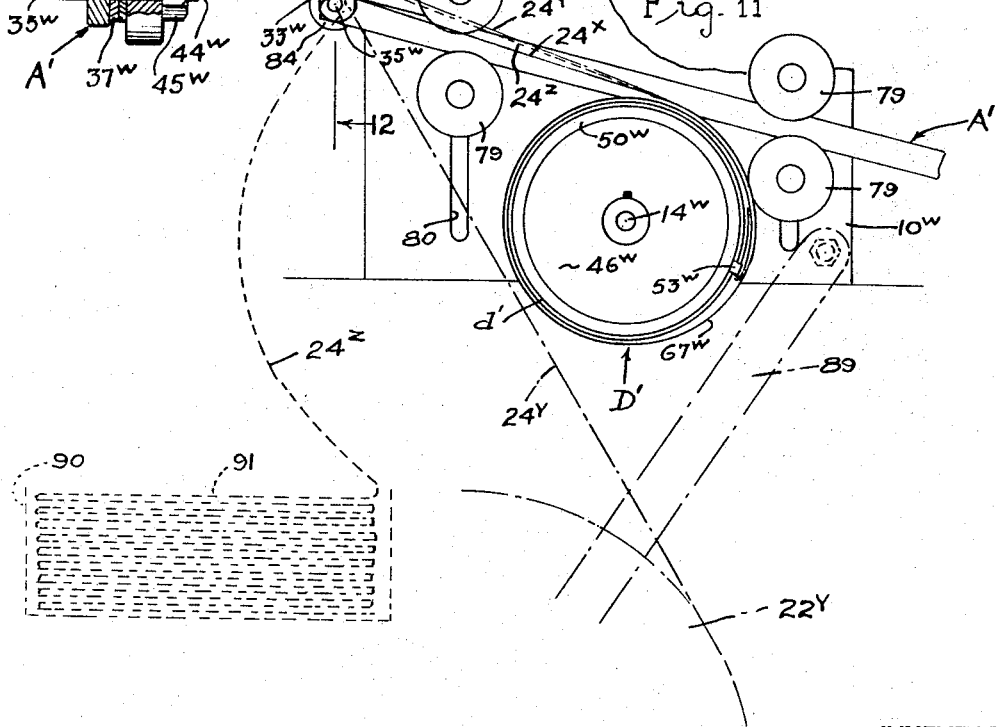
INVENTOR.
Kermit B. Knutson United States Patent Office 3,339,797
Patented Sept. 5, 1967

3,339,797
LABEL DISPENSERS
Kermit B. Knutson, 1316 E. 24th St.,
Minneapolis, Minn. 55404
Filed Apr. 4, 1966, Ser. No. 540,004
21 Claims. (Cl. 221—73)

My invention relates to improvements in label dispensers and, more particularly, to dispensers for dispensing pressure-sensitive adhesive labels from label stock of liner-borne labels.

In such label stock, a series of labels of selected length and width, treated on their inner faces with pressure-sensitive adhesive, adhere to a strip of liner, which is of such material that the labels adhere to it only with sufficient tenacity normally to hold them in place on the liner, while admitting of their ready detachment from the liner preparator to the ultimate affixation thereof. Such label stock is conventionally sold in rolls wrapped on annular cores and is also marketed in a form wherein the liner is fan-folded into a packet which is packaged in a box or carton.

An object of the invention is to provide an improved, relatively simple, durable and efficient dispenser, capable of being conveniently operated by a single hand of a user and adapted successively to strip and deliver pressure-sensitive labels from a run of label-bearing liner led from a supply of label stock.

More specifically, it is an object of the invention to provide a dispenser of the nature aforesaid having a liner take-up drum and a label stripper element movable relative to the drum forth and back in a work throw and a return throw, which stripper element, on the work throw thereof, effects the stripping of the liner from the labels in said run of the liner and also lengthens said run, and which stripper element coacts with the take-up drum to effect the wrapping of the liner thereon and take up the said lengthening of said run of the liner.

Another object of the invention is to provide the stripper element with a guide member which is overrun by the aforesaid run of a liner and which defines a bend in said run and shifts such bend along said run to cause the liner to peel away from the labels thereon and free them for delivery.

A further object is to furnish the stripper element with a second or auxiliary guide member which cooperates with the aforesaid or principal guide member to provide relative sharpness in said bend in the liner, between the supply of label stock and the take-up drum, for insuring satisfactory stripping of the liner from its labels under various conditions of use.

An additional object of the invention is to provide a stripper element, as above, having a handle for use in moving said stripper element and which serves also as an auxiliary guide member in defining said bend in the liner.

Another object is to supply a movable carrier medium for supporting both the stripper element and a supply of label stock, a further object being to provide such a carrier medium so mounted that it will gravitate to move the stripper element on its work throw, a still further object being so to mount such carrier medium that it will gravitate pendulously.

An additional feature of the invention is the provision of clutch means interposed between the movable carrier medium and the take-up drum for turning said drum on movement of the carrier medium.

A still further feature of the invention resides in mounting the movable carrier medium so that the stripper element thereon will move planetarily relative to the take-up drum and will wrap the liner on said drum concurrently with the stripping of the liner from a label and the lengthening of the liner's run between the supply of label stock and the take-up drum.

Other objects of the invention reside in the novel combination and arrangement of parts and in the details of construction hereinafter illustrated and/or described.

In the drawings:

FIG. 1 is a side elevational view of label dispenser constructed in accordance with my invention, portions thereof being broken away to reveal construction otherwise concealed.

FIG. 2 is an end elevational view of the structure shown in FIG. 1, portions thereof being broken away as in said FIG. 1.

FIG. 3 is an enlarged sectional view taken as on line 3—3 of FIG. 2.

FIG. 4 is an enlarged sectional view taken as on line 4—4 of FIG. 1.

FIG. 5 is an enlarged sectional view taken as on line 5—5 of FIG. 1.

FIG. 6 is a diagrammatical view showing parts, seen in FIG. 1, in positions as at the start of a work throw of the stripper element.

FIG. 7 is a view similar to FIG. 6, showing the parts in position as at the end of a work throw of the stripper element.

FIG. 8 is a side elevational view of a label dispenser illustrating an alternate form of the invention.

FIG. 9 is a plan view of the structure shown in FIG. 8.

FIG. 10 is a sectional view taken as on line 10—10 of FIG. 8.

FIG. 11 is a view similar to FIG. 8 showing principally in diagram alternate forms of supply of label stock in various positions relative to the stripper element.

FIG. 12 is an enlarged sectional view taken as on the line 12—12 of FIG. 11.

The form of dispenser illustrated in FIGS. 1 to 7 inclusive, includes a support 10, which, in the form shown, constitutes the body of an ordinary C-clamp having the usual outwardly turned end portions, which form a clamp jaw 11 and a screw mounting 12 for a clamp screw 13. The support 10, in the form illustrated, or in other suitable form, will be suitably mounted to hold the dispenser securely in place for its operation. A stud shaft 14 extends outwardly from the support 10, the inner end portion of said shaft 14 being screwed into threaded bore 15 in the said support 10 and upset therein rigidly to secure said stud shaft 14 to said support.

A carrier medium A shown in the form of a bar, is supported by the stud shaft 14, said carrier bar A having a bore 16 therein between its ends, one end portion of said carrier bar A being a delivery arm 17 and the other end portion of said carrier bar being a stock arm 18. Said bore 16 in the carrier bar A pivotally receives a transmission sleeve 19 journaled on the stud shaft 14, said carrier bar A being rockable on said sleeve 19.

Extending from the stock arm 18 of the carrier bar A is a spindle 20, said spindle 20 being screwed into a threaded bore 21 in said arm 18 and upset therein for rigidly securing the same to the carrier bar A. A drum B on the spindle 20 rotatably supports a roll 22 of label stock consisting of a series of labels 23 borne by a liner 24. Said drum B includes a pair of drum heads $b$, each having a center web 25 with an axial bore 26 therein for the reception of the spindle 20. Each drum head $b$ has an annular shoulder 27 and a peripheral flange 28. The shoulder 27 of each drum head $b$ is received within one end of the core 29 of the label supply roll 22 with the peripheral flange 28 abutting such end of said core 29. An abutment washer 30 on the spindle 20 is interposed between the stock arm 18 of the carrier bar A and the inner drum head $b$ of said drum B. A collar 31 of resilient material on the spindle 20 yieldingly grips said spindle and bears against the outer drum head *b* setting up the desired amount of frictional resistance to the rotation of the label stock roll 22. Adjustments of said drum heads *b* of said collar 31 along the spindle 20 accommodate label stock rolls of various lengths. A retainer strap 32 fastened to the outer drum head *b* keeps the convolutions of a stock roll 22 from slipping edgewise off the roll.

A stripper element C, mounted on the delivery arm 17 of the carrier bar A, includes a guide member 33, a handle 34 and a mounting pintle 35. The guide member 33 is a U-shaped strap having a body 36 and ears 37, each ear 37 being formed with an aperture 38 therein. The handle 34, similarly shaped, has a body 39 and ears 40 each of which is formed with an aperture 41.

The guide member 33 nests within the handle 34 with its body 36 slightly spaced from the body 29 of the handle 34, as at 42, with its apertures 38 aligned with the apertures 41 of the handle 34.

Said mounting pintle 35 is threaded at its inner end portion into a threaded bore 43 in the delivery arm 17 of the carrier bar A, the pintle 35 extending through and inwardly beyond said delivery arm 17 to provide a threaded extension 44 of said pintle 35. The apertures 38, 41 in the outer ears 37 of the guide member 33 and the handle 34 receive the outer end portion of said mounting pintle 35, while the apertures 38, 41 in the inner ears of said guide member 33 and the handle 34 receive said threaded extension 44 of the pintle 35 such extension being supplied with a clamp nut 45 for clamping the inner ears 37, 40 of the guide member 33 and handle 34 against each other and against the delivery arm 17 of the carrier bar A to hold said guide member and handle in place in the stripper element C.

The spindle 20 for supporting a roll of label stock, the stud shaft 14 and the stripper element C are coextensive and they are all mounted in the carrier bar A in substantially coplanar relationship.

A take-up drum D rotatably mounted on the stud shaft 14 includes a pair of drum heads *d* each having a center web 46, the center web 46 of the outer drum head *d* having a central opening 47 rotatably receiving the said stud shaft 15, the center web 46 of the inner drum head *d*, being formed with a central bushing 48 which receives the outer end of the aforesaid transmission sleeve 19 and is keyed thereto by means of a set screw 49 threaded in said bushing 48 and bearing against said sleeve 19. Each drum head *d* has a peripheral flange 50 and an annular shoulder 51 between said flange 50 and the center web 46. Said peripheral flange 50 of each drum head *d* bears against one end of a cylindrical body 52 and the annular shoulder 51 fits snugly into one end of the body 52, said body being secured to said shoulder 51 as by means of a suitable adhesive.

For the convenient attachment of the end of a liner 24 to the take-up drum D, an attachment clip 53 is provided as best shown in FIGURE 5. Said clip 53 consists of a generally U-shaped strap having a main reach 54, legs 55 and inwardly turned terminal portions 56.

Said legs 55 embrace opposite ends of the cylindrical body 52 of the take-up drum D and said terminal portions 56 of said clip 53 underlie the inner periphery of said body 52 where they are so fixed as by means of a suitable adhesive, with said main reach 54 of the clip 53 slightly spaced, as at 57, from the outer periphery of the drum's cylindrical body 52.

A keeper collar mounted on the stud shaft 14 and keyed thereto by a set screw 59, abuts against the center web 46 of the outer drum head *d* of the take-up drum D and holds it on said stud shaft 14.

A spacing washer 60 encircling said transmission sleeve 19, is interposed between the inner drum head *d* of the take-up drum D and the carrier bar A while another spacing washer 61 likewise encircling said sleeve 18, is interposed between said carrier bar A and a ratchet wheel 62 mounted on said transmission sleeve 19 and keyed thereto by a set screw 63.

The aforesaid ratchet wheel 62 is common to two one-way clutch mechanisms, one for depriving the take-up drum D of clockwise rotation, as viewed in FIG. 1, and the other for the clockwise turning of said take-up drum D by the carrier bar A on the swinging of its delivery arm 17 to the right, as seen in FIG. 1. Said first noted clutch mechanism consists of said common ratchet wheel 62 and a spring-pressed pawl 64 in engagement therewith and pivotally mounted on the support 10, the second noted clutch mechanism consisting of said common ratchet wheel 62 and a spring-pressed pawl 65 in engagement therewith and pivotally mounted on the arm 17 of the carrier bar A.

After mounting a roll 22 of label stock on the drum B which is carried by the spindle 20 on the carrier bar A, a user will lead the liner 24 from said roll 22, first along one side of the take-up drum D to a position overrunning the guide member 33 of the stripper element C, and, then back, preferably along the same side of the take-up drum D to the attachment clip 53 on said drum D where the end of the liner 34 is tethered by means of a fold 66 turned under the main reach 54 of said clip 53, such fold 66 being overwrapped by at least one convolution of a liner-winding 67 on the drum D to better secure the tethering of the liner 24 to said drum D.

With the liner disposed as aforesaid, the guide member 33 of the stripper element C defines a bend 68 in a run 69 of the liner 24 extending in a first reach 70 from the stock roll 22 to said guide member 33, and thence, in a second reach 71 to the joinder of said run 69 of the liner 24 with the liner-winding 67 on the take-up drum D.

The stripper element C mounted on the delivery arm 17 of the pivotally supported carrier bar A, is movable forth and back, with said arm 17, in a cycle of movement having a work throw and a return throw.

A user moves the stripper element C, on its work throw, by means of the handle 34, the return throw of said stripper element C being imparted thereto by gravitational movement of the stock arm 18 which hangs pendulously from the stud shaft 14 and moves past center on the work throw of the stripper element C.

During said work throw of the stripper element C, the guide member 33 thereof slides along the run 69 of the liner 24 in retreat from the joinder of the liner's said run 69 with the drum's liner-winding 67 shifting the liner's bend 68 along the liner 24, causing the liner to traverse said bend 68 and peel away from a label 23, contiguous to said bend 68, whereby such label is freed for delivery from the stripper element C.

On such work throw of the stripper element C to free a label from said run 69 of the liner 24, the take-up drum D is deprived of rotation by the aforesaid clutch pawl 64, and said stripper element C moves planetarily about said take-up drum D, wherewith the guide member 33 of said stripper element C lengthens said run 69 of the liner 24 by drawing added length of liner from the stock roll 22 and, at the same time, wraps the liner 24 on the take-up drum D taking up the said lengthening of said liner.

FIGS. 6, 3, and 7, in that order, illustrate progressive positions assumed by the stripper element C on its work throw, and show a label 23 in the process of being freed from the liner 24 at the bend 68 therein defined by the guide member 33 of said stripper element C.

The body 39 of the handle 34 of the stripper element C is engaged by some of the fingers of a user's hand in moving said stripper element C on its work throw, while other digits of the same hand are held at opposite sides of a label 23, from which the liner 24 is being peeled in readiness to grasp such label when it is freed from said liner. This use of one hand to move the stripper element C and also to grasp a freed label leaves the other hand wholly available for other action attending the operation of the dispenser.

The above described disposition of said run 69 of the liner 24 relative to the roll of label stock 22, the stripper element C and take up drum D is optional and may be otherwise in which event the desirable parallelism between the first and second reaches 70, 71 of the liner's run 69 may not exist without supplementation. Accordingly, auxiliary guiding means, complementing said first mentioned or principal guide member 33 are employed as will now appear.

Said body 39 of the handle 34 of said stripper element C constitutes an auxiliary guide member complementing said principal guide member 33, said handle body 39 serving to direct said first reach 70 of the liner's run 69, at that portion thereof contiguous to the liner's bend 68, in approximation of parallelism with the corresponding portion of the second reach 71 of said liner's run 69, whereby the bend 68 in said liner 24 will be rendered relatively sharp to facilitate the peeling away of the liner 24 from a label 23 at the liner's said bend 69.

The mounting pintle 35 of the stripper element C also constitutes an auxiliary guide member complementing said principal guide member 33, said mounting pintle 35 serving to direct the second reach 71 of the liner's run 69, at that portion thereof contiguous to the liner's bend 68, in approximation of parallelism with the corresponding portion of said first reach 70 of the liner 24, thus contributing to the establishment of sharpness in the bend 68 and facilitating the stripping of a liner 24 from a label 23 at said bend 68 in said liner 24.

On the gravitating return throw of the stripper element C, the pawl 65 of the swinging delivery arm 17 of the carrier bar A engages and turns the ratchet wheel 62, the movement of which is imparted through the transmission sleeve 19 to the take-up drum D, to turn said take-up drum D clockwise, as seen in FIG. 1. This turning of the take-up drum D restores the relationship existing between the stripper element C and the drum's liner-winding 67, at the start of the work throw of said stripper element C.

The length of throw of the stripper element C normally will conform with the length of the label being dispensed. However, in dispensing especially long labels, the stripper element C will be pumped forth and back until the full length of a long label has been freed from the liner 24.

In the following description of the embodiment of the invention shown in FIGS. 8 to 12, inclusive, the parts having counterparts in the above described embodiment of the invention, shown in FIGS. 1 to 7 inclusive, will be referred to by similar reference characters to indicate the similarity of parts.

Referring to FIGS. 8 to 12 inclusive, it will be seen that the support $10^w$ is in the form of a panel having an inwardly turned base flange 72 which is adapted to be fastened as by screws 72 to a table or bench 74. A stud shaft $14^w$ extends outwardly from the support panel $10^w$, the inner end portion of said shaft being screwed into a threaded bore $15^w$ in said support and upset therein to make a rigid connection. A take-up drum D' rotatable on the stud shaft $14^w$ has its inner head $d'$ formed with a central bushing $48^w$. This bushing $48^w$ is press-fitted about the outer shell 75 of a conventional one-way roller clutch $64^w$ the inner member of which (not shown) receives said stud shaft $14^w$. Said clutch $64^w$ permits clockwise rotation of the take-up drum D', as seen in FIG. 8, but deprives said drum of counterclockwise rotation. A clutch wheel 76 is rotatable on said stud shaft $14^w$ between the take-up drum D' and support panel $10^w$ said clutch wheel 76 having therein a peripheral groove 77 wherein a friction band 78 is lodged. A carrier bar A' is reciprocally mounted on the support panel $10^w$ above the clutch wheel 76 for edgewise contact with the friction band 78 on said wheel 76. On the outer face of said clutch wheel is an annulus 98 of frictional material which engages the peripheral flange $50^w$ of the drum head $d'$ of the take-up drum D'. Upon the turning of the clutch wheel 76, as a result of frictional contact between the carrier bar A' and the friction band 78 of the clutch wheel 76 said wheel frictionally turns the take-up drum D' winding the liner $24^w$ thereon. A stripper element C' is mounted on the carrier bar A' and is movable with said bar A' forth and back in work and return throws for freeing labels from a liner $24^w$ and for taking up the label-denuded liner $24^w$ on the take-up drum D'. The means for reciprocally mounting the carrier bar A' consists of a pair of flanged rollers 79 supported on the support panel $10^w$ forwardly of the take-up drum D; and a second pair of flanged idler rollers 79 supported on said panel $10^w$ rearwardly of the take-up drum D'. For each pair of idler rollers 79, the panel $10^w$ has therein a vertical slot 80 which receives the threaded axial studs 81 of said rollers 79, said studs being supplied with nuts 82 which engage the inner side of the panel $10^w$ and clamp said rollers 79 to said panel in adjusted positions.

Each pair of rollers 79 has a lower roller 79 on which the carrier bar A' rides edgewise and an upper roller 79 which overrides the upper edge of said carrier bar A'. The idler rollers 79 usually will be adjusted on the support panel $10^w$ to guide the carrier bar A' in an inclined path pitched more or less to attain a gravitating return throw of the stripper element C', without violence, and also to minimize the effort required in moving the stripper element C' on its work throw. Said stripper element C' is mounted on the carrier bar A' at its elevated end and, as shown in FIG. 8, a drum carrying spindle $20^w$ and drum B' for a label stock roll $22^w$ are mounted on the depressed end of the carrier bar A'. The handle $34^w$ of the stripper element C' has thereon a finger piece in the form of a flange 83 outwardly turned from the body 39 of said handle $34^w$.

FIGS. 8 and 9 show the run $69^w$ of the liner $24^w$ extending in a first reach $70^w$ from the label supply roll $22^w$ to the guide member $33^w$ of the stripper element C' which is overrun by the liner $24^w$ to form a stripping bend $68^w$, said run $69^w$ of the liner $24^w$ extending in a second reach $71^w$ from said guide member $33^w$ to the liner-winding $67^w$ on the take-up drum D'.

In the operation of said second embodiment of the invention, the take-up drum D' winds the liner $24^w$ on the return throw of the stripper element C' which admits of the building up of the liner-winding $67^w$ on said drum without need of a compensating change in the length of the throw of the stripper element C'. It, therefore, is advantageous in said second embodiment of the invention to employ stop means for regulating the length of throw of the stripper element C' rather than depend upon the operator for accuracy in manipulation of said stripper element C'. A stop collar 84 encircling the threaded extension $44^w$ of the mounting pintle $35^w$ between the ear $40^w$ of the handle $34^w$ and the clamp nut $45^w$ on said extension $44^w$ (FIGS. 11 and 12) engages the forward edge of the support panel $10^w$ at the end of the return throw of said stripper element C'. A stop block 85, slotted to receive the carrier A', is slidably mounted on said bar A' between the stock spindle $20^w$ and the rearward edge of said support panel $10^w$, said stock block 85 being provided with a set screw 86 engageable with the outer face of the carrier bar A' to clamp said stop block 85 in selected positions on said bar A'. An abutment screw 87 threaded in said stop block 85 extends alongside the carrier bar A' and abuts against said rearward edge of the support panel $10^w$ at the end of any selected length of work throw of the stripper element C'. Adjustment of said abutment screw 87 may be made as an accuracy adjustment over any adjustment made by bodily shifting the stop block 85 on the carrier bar A'.

When the label stock to be used is wound in a large and relatively heavy roll, indicated at $22^x$ in FIG. 11, such roll may be mounted on a drum $B^2$ rotatable on a spindle $20^x$ carried by an upstanding arm 88 bolted to the support panel $10^w$. In such location of the stock roll $22^x$, the body 39<sup>w</sup> of the handle 34<sup>w</sup> of the stripper element C' will function as an auxiliary guide member for attaining a relatively sharp bend 68<sup>w</sup> principally defined in the liner 24<sup>x</sup> by guide member 33<sup>w</sup>. Another mounting of a stock roll 22<sup>y</sup> is supported by an arm 89 depending from the support panel 10<sup>w</sup> and the mounting pintle 35<sup>w</sup> of the stripper element C' functions as an auxiliary guide member in attaining a relatively sharp stripping bend 68<sup>w</sup> principally defined in the liner 24<sup>y</sup> by the guide member 33<sup>w</sup>.

A different form of label stock, namely, a fan-folded label-bearing liner, may be used, as indicated in dotted lines in FIG. 11 in which case a box 90 containing a packet 91 of fan-folded liner 24<sup>z</sup> may rest on the floor or other support beneath the stripper element C', with the liner 24<sup>z</sup> directed around the mounting pintle 35<sup>w</sup> of said stripper element C' before overrunning the guide member 33<sup>w</sup> of said element C'. Also in this case, it will be seen that the mounting pintle 35<sup>w</sup> of the stripper element C' serves as an auxiliary guide member in promoting sharpness in the bend 68<sup>w</sup> principally defined in the liner 24<sup>z</sup> by the guide member 33<sup>w</sup> of the stripper element C'.

Changes in the specific form of the invention, as herein described, may be made within the scope of what is claimed without departing from the spirit of the invention.

Having described the invention, what is claimed as new and desired to be protected by Letters Patent is:

1. In a dispenser for dispensing pressure-sensitive labels from a supply of stock consisting of a series of such labels borne by a liner, means for supporting a supply of label stock, a rotatable take-up drum for winding thereon a liner led from the supply of label stock, a movable carrier medium, a stripper element, means for securing the stripper element to said carrier medium, said stripper element being movable forth and back along with the carrier medium in a cycle of movement having a work throw and a return throw, said stripper element having a guide member adapted to be overrun by and to define a bend in the run of a liner extending in a first reach from the supply of label stock to said guide member, and thence, in a second reach to its joinder with the liner-winding on the take-up drum means for depriving the take-up drum of rotation on the work throw of the stripper element, said guide member on said work throw of the stripper element, sliding along said run of the liner in retreat from said joinder thereof with the drum's liner-winding, shifting the liner's bend along said liner, causing the liner to traverse said bend and to peel away from a liner-borne label contiguous to said bend, thus freeing such label for delivery from the stripper element, said stripper element, on its said work throw, lengthening said run of the liner, drawing the added length from the supply of label stock, and means for turning the take-up drum on the return throw of the stripper element to restore the relationship existing, at the start of the work throw, between said stripper element and the drums liner-winding, said stripper element on one of its throws in a cycle of movement, coacting with the take-up drum to effect the wrapping of the liner onto the liner-winding on said drum and take up the said lengthening of said run of the liner.

2. A dispenser as defined in claim 1, wherein the stripper element, on its work throw, moves planetarily relative to the drum's liner-winding, whereby said run of the liner is lengthened and the lengthening thereof is concurrently taken up by the wrapping of the liner on said liner-winding.

3. A dispenser, as defined in claim 1, wherein the stripper element is moved by gravity on its return throw.

4. A dispenser, as defined in claim 1, wherein the carrier medium is an element of the means for turning the liner take-up drum.

5. A dispenser, as defined in claim 1, wherein the stripper element has a handle adjacent to the guide member thereof, said handle being adapted to be engaged by some of the fingers of a user's hand for moving the stripper element while other digits of the same hand are stationed at opposite sides of a label from which the liner is being peeled, thus to promote the ready grasping of such label along with the moving of its stripper element by a single hand of the user.

6. A dispenser, as defined in claim 1, wherein said guide member is the principal guide member of said stripper element and wherein said stripper element also has an auxiliary guide member offset from said principal guide member, said auxiliary guide member being adapted to engage one of said reaches of said run of the liner and maintain that portion thereof contiguous to the liner's bend in approximation of parallelism with the corresponding portion of the other reach of said liner, thereby rendering said bend in said liner relatively sharp to facilitate the peeling away of the liner from the label at said bend in said liner.

7. A dispenser, as defined in claim 6, having a handle for moving the stripper element, said handle being the said auxiliary guide member and adapted to be engaged by some of the fingers of a user's hand for moving the stripper element, while the other digits of the same hand are stationed at opposite sides of a label from which the liner is being peeled, thus to promote the ready grasping of such label along with the moving of the stripper element by a single hand of the user.

8. A dispenser, as defined in claim 6, wherein the means for securing the stripper element to said carrier medium includes a fastening piece which is also the said auxiliary guide member of said stripper element.

9. In a dispenser, as defined in claim 6 wherein the stripper element has a second auxiliary guide member, the first mentioned auxiliary guide member and said second auxiliary guide member being located at opposite sides of the principal guide member and cooperating, respectively, with said first and second reaches of said run of the liner to maintain those portions of said reaches contiguous to the liner's bend in approximation of parallelism with each other to render said bend in said liner relatively sharp and thus facilitate the peeling away of the liner from a label at said bend in said liner.

10. In a dispenser, as defined in claim 1, wherein the means for supporting a supply of label stock is carried by the movable carrier medium approximately in line with the stripper element and the take-up drum whereby slackness in the reaches of said run of the liner is minimized, and said reaches of the liner closely parallel each other to promote sharpness in said bend of the liner.

11. A stripper, as defined in claim 1, wherein the supply of label stock is carried by the movable carrier medium.

12. In a dispenser for dispensing pressure-sensitive labels from a supply of stock consisting of a series of such labels borne by a liner, a support having a stud shaft issuing therefrom, an elongated carrier medium rockably pivoted intermediately thereof on said stud shaft, one end portion of said carrier medium forming a delivery arm, the other end portion thereof forming a stock arm hanging pendulously from said stud shaft, mounting means on the stock arm of the carrier medium for supporting a supply of label stock, a stripper element mounted on the delivery arm of said carrier medium, said stripper element being movable forth and back with the carrier medium in a cycle of movement having a work throw and a return throw, said pendulous stock arm of the carrier medium moving past center on said work throw of the stripper element, said stock arm of the carrier medium acting by gravity to move the stripper element on its return throw, a take-up drum rotatably mounted on said stud shaft for winding thereon a liner led from said supply of label stock, said stripper element having a guide member adapted to be overrun by and to define a bend in the run of a liner extending in a first reach from the supply of label stock to said guide member, and thence, in a second reach to its joinder with the liner-winding on said take-up drum, clutch means interposed between the take-up drum and said support for holding the drum against turning on the work throw of the stripper element, said guide member, on the work throw of the stripper element, sliding along said run of the liner in retreat from said joinder thereof with the drum's liner-winding, shifting the liner's bend along said liner, causing the liner to traverse said bend and peel away from a liner-borne label contiguous to said bend, thus freeing such label for delivery from the stripper element, said stripper element on its work throw, lengthening said run of the liner, drawing the added length thereof from said supply of label stock, said stripper element, also on its work throw, coacting with the take-up drum to effect the wrapping of the liner onto the liner-winding on said drum and take up the said lengthening of said run of the liner, and clutch means interposed between the carrier medium and the take-up drum to turn said drum on the return throw of the stripper element and restore the relationship existing, at the start of the work throw, between the stripper element and the drum's liner-winding.

13. A dispenser, as defined in claim 12, wherein the mounting means for supporting the label stock is in the form of a spindle rotatably supporting a roll of stock, said spindle and said stud shaft and stripper element being substantially coplanar and, wherein the guide member of the stripper element is adapted to be overrun by said run of the liner extending in its said first reach from the supply roll of stock to said guide member along one side of the take-up drum and thence, extending in its said second reach along the said side of the take-up drum to the joinder of said second reach with said liner-winding, thus disposing said reaches of the liner adjacently and substantially in parallelism and thereby promoting sharpness in said bend in the liner.

14. In a dispenser for dispensing pressure-sensitive labels from a supply of stock consisting of a series of such labels borne by a liner, a support, an elongated carrier medium, means for mounting the carrier medium on the support for reciprocating movement, means for supporting a supply of label stock, a stripper element mounted on the carrier medium, said stripper element being movable forth and back with the carrier medium in a cycle of movement having a work throw and a return throw, a take-up drum rotatably mounted on said support for winding thereon a liner led from said supply of label stock, said stripper element having a guide member adapted to the overrun by and to define a bend in the run of a liner extending in a first reach from the supply of label stock to said guide member, and thence, in a second reach to the joinder of such reach with the liner-winding on the take-up drum, means for depriving the take-up drum of rotation on the work throw of the stripper element, said guide member, on the work throw of the stripper element, sliding along said run of the liner in retreat from said joinder thereof with the drum's liner-winding, shifting the liner's bend along said liner, causing the liner to traverse said bend and to peel away from a liner-borne label contiguous to said bend, thus freeing such label for delivery from the stripper element, said stripper element, on its work throw, lengthening said run of the liner, drawing the added length thereof from said supply of label stock, and means for turning the take-up drum on the return throw of the stripper element, said stripper element and take-up drum coacting, on said return throw of the stripper element, to effect the wrapping of the liner on said drum and take up the said lengthening of said run of the liner.

15. A dispenser, as defined in claim 14, wherein the supply of label stock is carried by the carrier medium.

16. A dispenser, as defined in claim 14, wherein the mounting means for the reciprocating carrier medium guides the said carrier medium in an inclined path.

17. A dispenser, as defined in claim 14, wherein the support has a stud shaft issuing therefrom, and the mounting means for the carrier medium is a roller means having a clutch wheel journaled on said stud shaft, and wherein said carrier medium frictionally engages the clutch wheel to turn the same and said clutch wheel, in turn, frictionally engages the take-up drum to turn said drum on the return throw of the stripper element.

18. A dispenser, as defined in claim 17, wherein the roller mounting means for the carrier medium includes idler guide rollers adjustably mounted on the support to vary the pitch of the path of the reciprocating carrier medium.

19. A dispenser, as defined in claim 14, having stop means for limiting the throw of said carrier medium.

20. A dispenser, as defined in claim 19, wherein the stop means is adjustable to vary the throw of said carrier medium.

21. In a dispenser for dispensing pressure-sensitive labels from a supply of label stock consisting of a series of such labels borne by a liner, a supporting structure, a carrier structure, one of said structures being movably relative to the other forth and back in a work throw and a return throw, a stripper element, a supply of label stock, said stripper element and supply of label stock being mounted on one of said structures, a liner take-up drum mounted on the other end of said structures for winding thereon a liner led from a supply of label stock, said stripper element having a guide member adapted to be overrun by and to define a bend in the run of a liner extending in a first reach from the supply of label stock to said guide member, and thence, in a second reach to the joinder of such reach with the liner winding on the take-up drum, means depriving said drum of rotation on the work throw of said movable structure, said guide member, on said work throw of the movable structure, sliding along said run of the liner in retreat from said joinder thereof with the drum's liner-winding, shifting the liner's bend along said liner, causing the liner to traverse said bend and to peel away from the liner-borne label contiguous to said bend, thus freeing such label for delivery from the stripper element, said stripper element, on said work throw of said movable structure, lengthening said run of the liner, drawing the added length from the supply of label stock, and means for turning the take-up drum, on the return throw of the movable structure, said stripper element and take-up drum coacting, on the return throw of said movable structure, to effect the wrapping of the liner on said drum and take up the said lengthening of said run of the liner.

References Cited

UNITED STATES PATENTS

| 3,093,528 | 6/1963 | Reich | 156—285 |
| 3,265,553 | 8/1966 | Kind et al. | 156—384 |

ROBERT B. REEVES, *Primary Examiner.*

STANLEY H. TOLLBERG, *Examiner.*